United States Patent [19]
Heiler et al.

[11] 3,817,196
[45] June 18, 1974

[54] AUTOMATIC GUIDE DEVICE FOR SEWING MACHINE OR MACHINE FOR ASSEMBLING TWO OR MORE SUPERPOSED ELEMENTS

[75] Inventors: Wolfgang Heiler, Soufflenheim; Rudolf Muller, Sessenheim; Jean-Jacques Becker, Bischheim, all of France

[73] Assignee: Vestra-Union S.A., Paris, France

[22] Filed: Apr. 10, 1972

[21] Appl. No.: 242,619

[30] Foreign Application Priority Data
Apr. 23, 1971 France .............................. 71.15294

[52] U.S. Cl. .......................... 112/151, 112/153
[51] Int. Cl. ................. D05b 35/00, D05b 35/10
[58] Field of Search ........................ 112/136–153, 112/121.15, 121.29, 257–260, 50–52, 121.24, 23; 214/1 BE

[56] References Cited
UNITED STATES PATENTS

| | | | |
|---|---|---|---|
| 1,682,362 | 8/1928 | Von Halle ................. | 112/121.24 X |
| 1,714,860 | 5/1929 | Fasano ........................... | 112/152 |
| 2,879,875 | 3/1959 | Swackhamer .................. | 112/121.15 |
| 3,028,822 | 4/1962 | Hollister et al. ..................... | 112/153 |
| 3,054,367 | 9/1962 | Loiselle ............................. | 112/152 |
| 3,155,060 | 11/1964 | Brenner ............................ | 112/153 |
| 3,392,691 | 7/1968 | Pope ................................. | 112/153 |
| R2,163 | 1/1866 | Barnum ........................... | 112/150 |

FOREIGN PATENTS OR APPLICATIONS

| | | | |
|---|---|---|---|
| 3,495 | 12/1871 | Great Britain ..................... | 112/153 |

*Primary Examiner*—James R. Boler
*Assistant Examiner*—Peter Nerbun
*Attorney, Agent, or Firm*—Young & Thompson

[57] ABSTRACT

The disclosure is of a device permitting the automatic passage of a fabric element or an element of other material beneath the working tool of a machine, which device is characterised in that it is constituted by an upper plate, preferably of transparent material, by a base plate and by a lateral guide piece, which are assembled with one another by means of screws or the like.

The invention can be utilized as a guide element, especially in automatic overcasting, leather-stitching and welding machines.

3 Claims, 3 Drawing Figures

PATENTED JUN 18 1974　　　　　　　　　3,817,196

3,817,196

AUTOMATIC GUIDE DEVICE FOR SEWING MACHINE OR MACHINE FOR ASSEMBLING TWO OR MORE SUPERPOSED ELEMENTS

INTRODUCTION AND BACKGROUND OF THE INVENTION

The present invention concerns guide devices, especially for sewing machines, which permit of passing a fabric element or several such elements in superposition beneath the needle.

In known devices of this kind the sewing or welding according to variable profiles of the element to be passed beneath the needle or working tool, such as a welding straight edge, is effected either by displacement of the element over a guide base according to two coordinates, the one vertical and the other horizontal, or by change of the angle of the tool as a function of the direction of conveying of the element.

To this end these devices are equipped, as the case may be with guide rails with drive elements for obtaining the necessary movements and/or with guide-edge detectors based upon an electric or fluidic optical system with the purpose of effecting the change of angles of the machine in relation to the material.

It follows that these devices are on the one hand complex and delicate in realisation and thus costly and on the other hand necessitate continuous supervision.

BRIEF SUMMARY OF THE INVENTION

In order to palliate these drawbacks the invention has for its object an automatic guide device which, being fitted on a sewing machine or any other machine in which a material passes beneath a tool, on the basis of a precise regulation of the transport mechanism, permits a passage beneath the machine according to the profile of the cut edge, without external guidance of the material to be worked.

This automatic passage beneath the machine along the profile of the edge takes place in a perfect manner, independently of the straight, concave or convex form of the edge or of any sequence of these forms.

FURTHER DESCRIPTION AND ADVANTAGES OF THE INVENTION

The device according to the invention is composed essentially of an upper plate preferably made of a transparent material, of a base plate and of a lateral guide piece comprising a lug serving for the securing of the device to the machine in the vicinity of the lateral face of the presser foot in the case of a sewing machine.

According to another characteristic of the invention and with the purpose of obtaining perfect guidance even for pieces of very large dimensions, it is provided that the plate of the machine is equipped with compressed air apertures (not shown) which establish an air cushion between the said plate and the piece to be worked.

The invention will be clearly understood with the aid of the following description and the accompanying drawing which illustrates by way of example a form of embodiment of the device according to the present invention.

BRIEF DESCRIPTION OF THE VIEWS IN THE DRAWING

DETAILED DESCRIPTION OF THE PREFERRED EMBODIMENT

Figure 1:
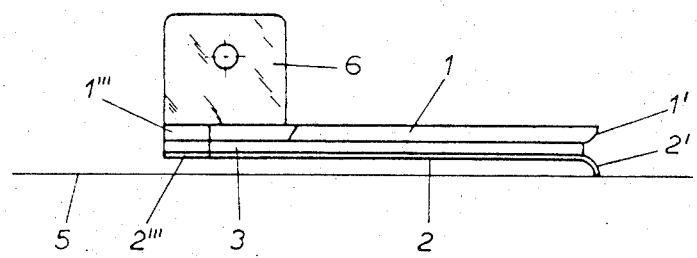
FIG. 1 is an elevation of the device according to the invention.
Figure 2:
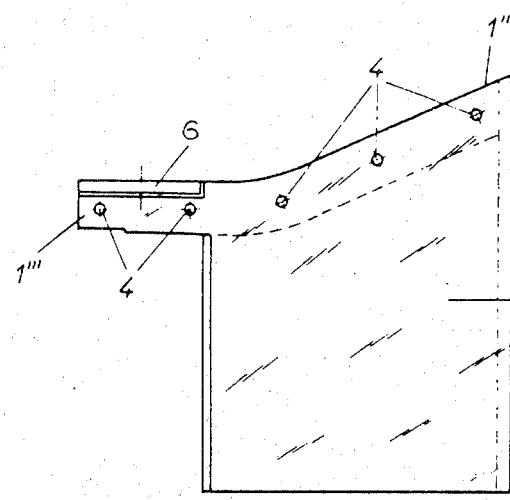
FIG. 2 is a plan view of the device according to FIG. 1.
Figure 3:
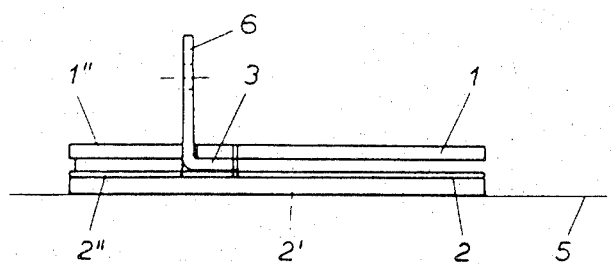
FIG. 3 is a view thereof from the left.

As represented in the accompanying drawing, the guide device according to the invention is constituted by an upper plate 1, by a base piece 2 and by a lateral guide piece 3 placed between the plates 1 and 2 and assembled therewith by means of screws, rivets or the like 4.

The upper piece 1, preferably made of transparent material, comprises a rounding or chamfer 1' and a curved part 1'' on the side where the material to be worked is inserted.

The base plate 2, which possesses a curved part 2'' similar to that of the plate 1, is curved down at its end 2' towards the plate 5 of the machine.

By virtue on the one hand of the rounding 1' and on the other of the curved-down end 2', the material to be worked is easily engaged between the two plates 1 and 2.

The lateral guide piece 3, the thickness of which can be modified for example by the addition of packing pieces as a function of the thickness and/or number of elements to be worked, comprises a lug 6 serving for securing the whole of the device upon the machine.

Since the device must be fixed in the vicinity of the lateral face of the presser foot, each of the plates 1 and 2 is machined in its forward part so that it possesses only an extension 1''' and 2''' of width equal to that of the piece 3, the passage of the foot or the working tool thus being possible.

According to another characteristic of the present invention, and in combination with the aforementioned guide device, the machine plate 5 is equipped with piercings or apertures connected to a compressed air source (not shown), so that an air cushion is established between the machine plate and the element to be worked.

Such a measure is of particular interest in the case of elements of very large dimensions which are to be worked, in which case thus perfect guidance is obtained by the elimination of all friction between the element and the machine plate.

The guide device according to the invention is not of course limited to the form of embodiment as described and represented and it can comprise various modifications, especially as regards its dimensions which can be adapted to the machines upon which it is to be mounted.

When applied to a sewing machine, this device operates in the following manner:

It is fixed by means of the lug 6 of the piece 3 to the right-hand side of the presser foot and flush with the presser foot.

This, by spring pressure, forcefully engaging on the presser foot which normally lies flat on the transporter, is raised about 2 mm at its forward end or by a tension rod.

Hence there results a point-wise transport engagement which makes it possible for the material being sewn to turn around this point.

Under the influence of the transport the right-hand side (viewed in the direction of transport) of the material being sewn, in consequence of the braking action which results on the opposite side to the seam, there ensues a lateral displacement of the material.

This displacement of the material being sewn is made easier by the air cushion formed under the material so that the lateral motion is effected quickly enough to render it possible to follow concave curved paths as well.

The upper piece 1 prevents any vertical escape or folding of the material to be sewn, which necessarily causes the guidence of the fabric before the presser foot.

The device according to the invention can be utilized as a guide element for the effecting of stitched or welded seams in accordance with any profiles.

It is applicable with advantage to machines such especially as automatic overcasting machines, automatic leather-stitching machines and automatic high-frequency welding machines.

What is claimed is:

1. A device for guiding a plurality of workpieces of textile fabric and the like to be joined together in a sewing machine having a machine plate, said device comprising an upper plate, a lower plate, a lateral guide piece between said upper and lower plates, and means securing together said upper and lower plates and guide piece with said upper and lower plates overhanging said guide piece thereby to provide a recess for the reception of said workpiece, the free edge of said upper plate having a chamfer for directing said workpiece into said recess, the free edge of said lower plate being curved downwardly into contact with said machine plate to guide a said workpiece into said recess, said upper plate having a recess therein, said lateral guide piece having a lug upstanding therefrom and disposed in the last-named recess and extending upwardly beyond said upper plate for securing said device to a sewing machine or the like.

2. A device as claimed in claim 1, said lateral guide piece having a convex surface bounding one side of said recess.

3. A device as claimed in claim 1, the portions of said plates that overhang said lateral guide piece having free edges that are disposed at acute angles to an edge of said lateral guide piece that bounds said recess.

* * * * *